United States Patent [19]
Mullin et al.

[11] Patent Number: 5,970,218
[45] Date of Patent: Oct. 19, 1999

[54] PRIVATE PRINT

[75] Inventors: Thomas P. Mullin; Tom Phan, both of Irvine, Calif.

[73] Assignee: Toshiba America Information Systems, Inc., Irvine, Calif.

[21] Appl. No.: 08/798,614

[22] Filed: Feb. 11, 1997

[51] Int. Cl.[6] .............................. B41B 15/00; H04N 1/00
[52] U.S. Cl. ............................................. 395/114; 358/434
[58] Field of Search ................................. 395/200.2, 375; 358/402, 403, 404, 406, 440, 468, 400, 434

[56] References Cited

U.S. PATENT DOCUMENTS

| | | | |
|---|---|---|---|
| 4,843,571 | 6/1989 | Notermans et al. | 364/519 |
| 5,208,683 | 5/1993 | Okada | 358/468 |
| 5,224,156 | 6/1993 | Fuller et al. | 379/100 |
| 5,283,665 | 2/1994 | Ogata | 358/434 |
| 5,323,393 | 6/1994 | Barett et al. | 370/85.8 |
| 5,342,034 | 8/1994 | Mandel et al. | 270/53 |
| 5,351,136 | 9/1994 | Wu et al. | 358/440 |
| 5,353,124 | 10/1994 | Chou et al. | 358/400 |
| 5,358,238 | 10/1994 | Mandel et al. | 271/298 |
| 5,392,131 | 2/1995 | Umeno | 358/403 |
| 5,396,342 | 3/1995 | Meyer | 358/406 |
| 5,410,419 | 4/1995 | Muramatsu et al. | 358/468 |
| 5,435,544 | 7/1995 | Mandel et al. | 271/298 |
| 5,452,106 | 9/1995 | Perkins | 358/468 |
| 5,455,686 | 10/1995 | Nagano et al. | 358/404 |
| 5,461,488 | 10/1995 | Witek | 358/402 |
| 5,513,126 | 4/1996 | Harkins et al. | 364/514 A |
| 5,521,716 | 5/1996 | Itoh | 358/402 |
| 5,530,740 | 6/1996 | Irribarren et al. | 379/89 |
| 5,535,338 | 7/1996 | Krause et al. | 395/200.2 |
| 5,537,559 | 7/1996 | Kane et al. | 395/375 |

FOREIGN PATENT DOCUMENTS

| | | |
|---|---|---|
| 0208342 | 1/1987 | European Pat. Off. . |
| 0657845 A2 | 6/1995 | European Pat. Off. . |
| 3621543 | 1/1987 | Germany . |
| 03269756 | 12/1991 | Japan . |
| WO 89/06024 | 6/1980 | WIPO . |

OTHER PUBLICATIONS

Communication from European Patent Office re EP Application No. 98100708.1; dated Oct. 14, 1998 (the counterpart foreign application).
Technical documents related to Multifunction Peripheral Interface Standard, Level 1, version 5.3, Apr. 9, 1996.
Marketing documents related to Ricoh Lan XP, Nov. 1996.
Marketing documents related to Canon GP 200F, Nov. 1996.
Marketing documents related to Canon GP 30F, Nov. 1996.
Marketing documents related to: Konica 7050, 7728, 9715FP, 9615FP, MD System, QScan Film Scanner, EV–Jetcolor, Nov. 1996.

*Primary Examiner*—Amelia Au
*Assistant Examiner*—Samir Ahmed
*Attorney, Agent, or Firm*—Steven C. Sereboff; Arter & Hadden LLP

[57] ABSTRACT

A networked system having a plurality of workstations and a peripheral device, the peripheral device having a printing function, memory for storing a plurality of private print-ready jobs and input means for manually inputting information into the peripheral device. The peripheral device is also capable of accepting a private print job together with a PIN from a given workstation, placing the private print job into a queue of print jobs, converting the private print job into a private print-ready job, storing the private print-ready job in memory, and notifying the given workstation when the private job is print-ready. At any time thereafter, the peripheral device may accept a manually input PIN from a user physically present at the peripheral device, compare the PIN accepted from the given workstation with the PIN accepted from the physically present user and, if the PIN accepted from the given workstation corresponds to the PIN accepted from the physically present user, it selects the private print-ready job as the next job to be printed, and prints the print-ready job.

20 Claims, 4 Drawing Sheets

PRIVATE PRINT

BACKGROUND OF THE INVENTION

1. Field of the Invention

The present invention relates generally to a networked device having printing capabilities and, more particularly, to providing a secure, efficient private print function to such a networked device.

2. Description of Related Art

Networked systems in which a number of users operating individual workstations share resources such as a file server, printer and multifunction peripheral are well known. Where such systems are in use, individual workstations may be at some distance from the peripheral devices such as printers, which output paper copies. Thus, an individual may not be present when the job that he or she submitted is printed. Even an individual who is stationed near such a device may not be aware of his or her job being printed. Jobs will normally queue up and be printed in the order in which they are submitted to the device. In situations where many users share a device, or jobs are large or slow (due, for example, to being graphical or using a bit-mapped font) there may be a considerable time delay between submitting a job and it being printed.

Thus, it will often be the case that a given print job is removed and subject to scrutiny by a person other than the one who submitted the job for printing. There are times when this can cause severe problems. For example, confidential personnel records concerning benefits and pay information may be printed out. If an unauthorized person obtains access to such information, employee morale can be seriously affected. As another example, in large law firms, there may be a need to isolate certain attorneys from information concerning specific clients who may represent conflicts of interest for that particular attorney. Allowing an attorney who is supposed to be isolated by such a "Chinese Wall" access to print jobs relating to such a client may represent a severe ethical violation, having serious repercussions for both client and firm.

There have been some systems disclosed which attempt to deal with this situation.

One such system, exemplified by U.S. Pat. Nos. 5,342,034 and 5,358,238 to Mandel et al and U.S. Pat. No. 5,435,544 to Mandel, involves a standard "mailboxing unit", which is either a universal modular device or a stand-alone unit. Print jobs are directed and sorted to one of a number of mailbox bins within the mailboxing unit. The bins may by assigned to different users at different times, and some of them may be electronically locked, needing a user access code. Private mail can be directed to these electronically lockable bins, together with a user access code associated with a current private print job. The mailboxing unit is bulky, however, and can only handle a fixed number of private print jobs at any given time. Furthermore the size of any private job is limited by the size of the largest locked mailbox and the ability of the printer to combine mailboxes. Problems can also arise if a user forgets the access number that he or she associated with the job. When this happens not only will the user not be able to retrieve his or her copy, but the private mailbox will be rendered unusable by other private print jobs until such time as someone is able to override the 'lock' on the mailbox. Additionally, since the system provides no incentive for a user to pick up a job promptly, there will inevitably those who neglect to pick up their private jobs, rendering even fewer private bins available to other users.

In another system, disclosed in U.S. Pat. No. 4,843,571 to Notermans et al, a workstation user can associate a code with his or her print job. The printer then stores the print job without subjecting it to any further processing, placing it in a queue with other print jobs. The printer informs the workstation user when the job is ready for printing. If the user does not respond within a predetermined time to the message that his or her job is ready, then the print job is placed once again at the end of the queue of print jobs. If the user does respond from his or her workstation, then he or she is given a predetermined time to physically access the printer and enter the associated code. Presumably no jobs are being printed while the printer awaits these responses, and thus the printer experiences idle or down time, lessening its productivity.

With this system, the user must be ready to respond rapidly in order to maintain the position of his or her print job at the head of the queue ofjobs to be printed. Furthermore, since the print job will not be started without an acknowledgment from the sending workstation, if the user goes elsewhere after submitting the print job, he or she is constrained to return to the workstation before obtaining the print job (and will not be able to obtain the print job at all if the workstation fails in the interim). At the same time, if the user responds at the workstation, but does not respond quickly enough at the printer, he or she will be forced to wait at the printer until his or her job reaches the head of the queue once again. This wait decreases the user's productivity. Furthermore, the user will not know when he or she enters his or her PIN manually at the printer whether there is a queue or how long that queue is. If the user finds that he or she is waiting what seems to be an excessive time, the user may depart, whether voluntarily or involuntarily. If this happens, the job will no longer maintain the status of a private print job, since it is now destined to be printed whether or not the person who submitted it returns to the printer.

Furthermore, since the jobs are stored in coded form, the user will have to wait at the printer for the job to be converted to graphical output.

In addition, since the user need input only the PIN and not his or her identity, once at the printer it is possible, although highly unlikely, that the print jobs of two different people using the same PIN could be confused.

It is therefore the object of the invention to provide a facility for workstation users on a network to have private jobs printed in an efficient manner.

It is a further object of this invention to provide a facility for workstation users on a network to have private jobs printed where the user need not respond, within a predetermined time, to a job being ready, .

It is still a further object of this invention to provide a facility for workstation users on a network to have private jobs printed, where each job is printed with minimal delay once the user manually inputs identifying information into the printer.

It is yet another object of this invention to provide a facility for workstation users on a network to have private jobs printed where multiple jobs may be printed without the user having to input information at the printer for each job.

It is still another object of this invention to provide a facility for workstation users on a network to have private jobs printed, where the printer continues printing other jobs while waiting for the user to manually input a PIN number for printing of a private print job.

SUMMARY OF THE INVENTION

The previously described objects are achieved in a networked system having a plurality of workstations and a peripheral device, the peripheral device having a printing function, memory for storing a plurality of private print-ready jobs, memory for storing a plurality of coded print jobs, and input means for manually inputting information into the peripheral device. The peripheral device is capable of accepting a private print job together with a PIN from a given workstation, placing the private print job into a queue of print jobs, converting the private print job into a private print-ready job, storing the private print-ready job in memory, and notifying the given workstation when the private job is print-ready. At any time thereafter, the peripheral device may accept a manually input PIN from a user physically present at the peripheral device, and compare the PIN accepted from the given workstation with the PIN accepted from the physically present user. If the PIN accepted from the given workstation corresponds to the PIN accepted from the physically present user, the peripheral device selects the private print-ready job as the next job to be printed, and prints the private print-ready job.

DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Before proceeding to describe the invention fully, a few terms are defined. By "file server," it is meant a computer which controls access to file and disk resources on a network, and provides security and synchronization on the network through a network operating system. By "server," it is meant hardware or software which provides network services. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. By "multifunction peripheral (MFP)" it is meant computer equipment used to scan, print, facsimile transmit, and/or copy documents. A MFP also may have the capability to provide data modem and voice telephony services. The MFP may be an integrated unit or may be constituted from several discrete units that are interconnected on the same communication channel to the host or interconnected using several different channels. One or more of the subsystems may be omitted from the MFP. By "private print job" it is meant a printing job submitted from a user on a networked workstation to a printer or MFP located on the network, where the user wishes the hard copy printed to be unavailable to others using the same printer or MFP. It is expected that the user will be physically present at the printer when his or her private print job is printed. A private print job sent from the workstation will be in a coded form and not ready for immediate printing. By "print-ready job" it is meant a private print job that has been transformed by printer or MFP software into a graphical form that can be printed by the printer or MFP without further transformation.

Figure 1:
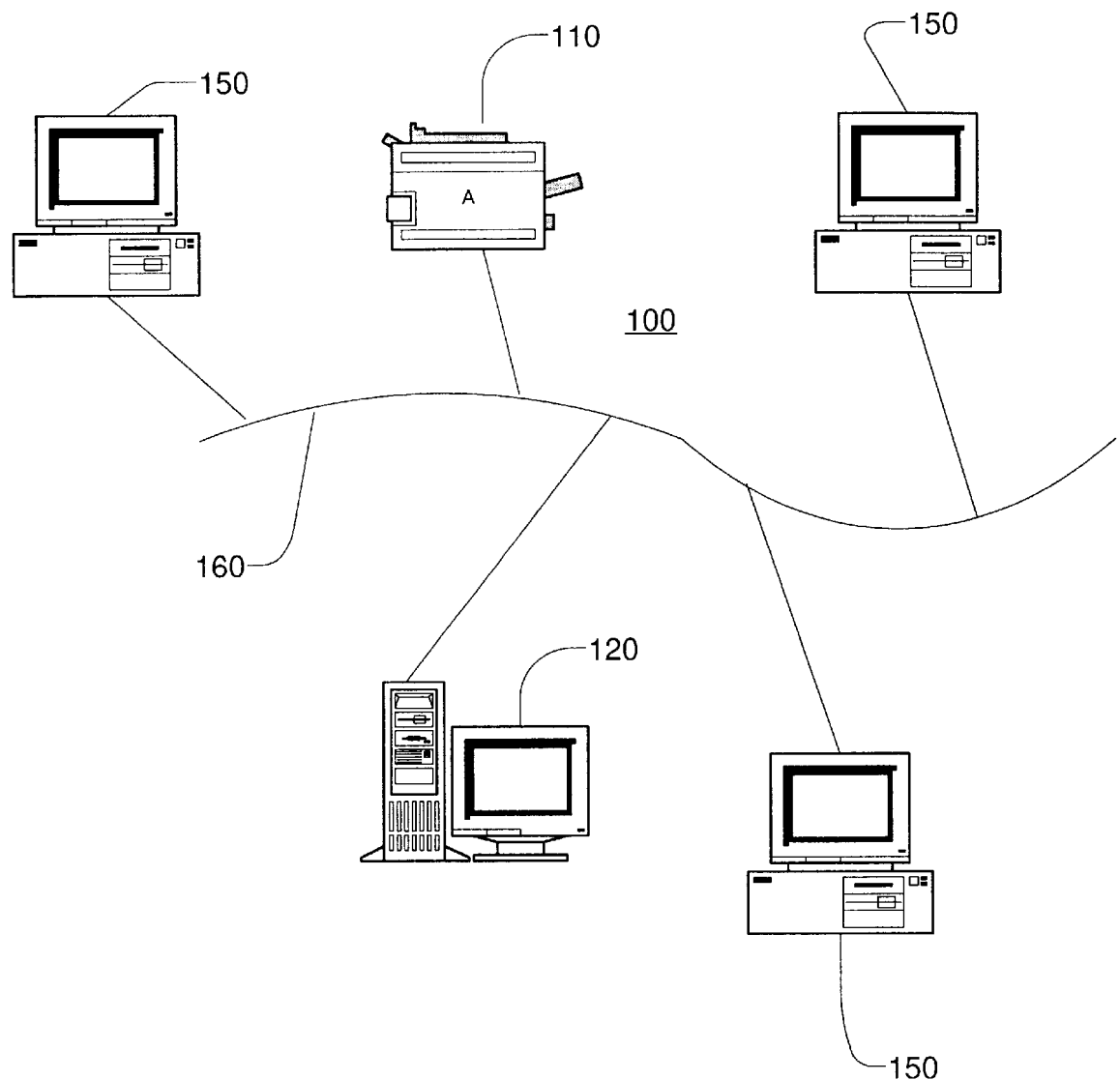
FIG. 1 is a block diagram of a LAN including a printer and workstations in accordance with the invention.

Referring now to FIG. 1, there is shown a block diagram of a LAN 100 in accordance with the invention. The LAN 100 includes a file server 120, workstations 150 and a peripheral device 110 coupled to one another via network communications lines 160. The file server 120 and workstations 150 are preferably those well known in the art, such as computers having Intel Corporation (Santa Clara, Calif.) microprocessors and running Microsoft Corporation (Redmond, Wash.) Windows operating systems. The LAN 100 may also include hubs, routers and other devices (not shown). The peripheral device 110 contains, at minimum, a printing function, memory which can be used for sorting print-ready jobs and a panel, keyboard or the like whereby a walk-up user may manually enter information into the peripheral device 110. This peripheral device 110 may be a printer, a copy machine capable of obtaining jobs from a workstation on the network, or a multifunction peripheral device.

Figure 2:
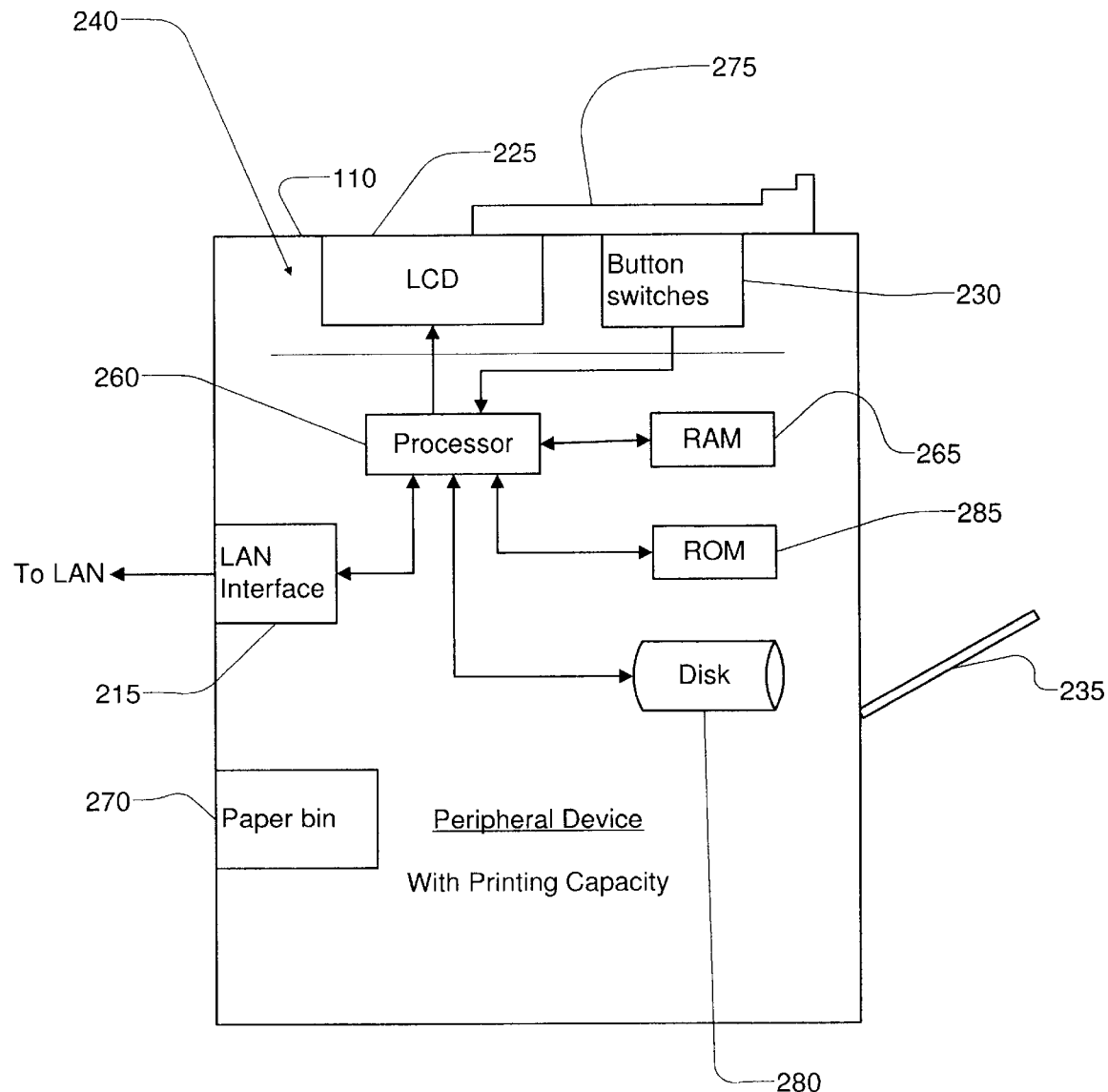
FIG. 2 is a block diagram of a peripheral device with printing capacity in accordance with the invention.

Turning now to FIG. 2, there is shown a block diagram of the peripheral device 110. The peripheral device 110 preferably comprises a high output printer having a LAN interface 215 and control hardware and software interface for managing and printing the print jobs. The hardware includes a short term memory 265 (preferably RAM) and processor 260 in which programs are stored and run, respectively, for controlling the functions of the peripheral device 110. The peripheral device 110 preferably also includes a long term memory 285 such as a ROM or EPROM and a disk drive 280 for both long term and short term storage. The peripheral device 110 includes standard components including manual paper input area 275, output tray 235, and paper bin 270.

The peripheral device 110 preferably includes a non-fixed display 225, such as an LCD, and a user input device 230, such as button switches. The peripheral device 110 has user interface software stored in the memory 285 which is responsible for displaying information on the display 225 and interpreting user inputs from the user input device 230. The non-fixed display and user input device 230 comprise an operator console 240, which, together with the user interface software, comprise a user interface subsystem. In the alternative, the display may be fixed.

For ease of expression, the peripheral device 110 will hereinafter be referred to as a printer, although all that is required is that it have a printer function.

Figure 3A:
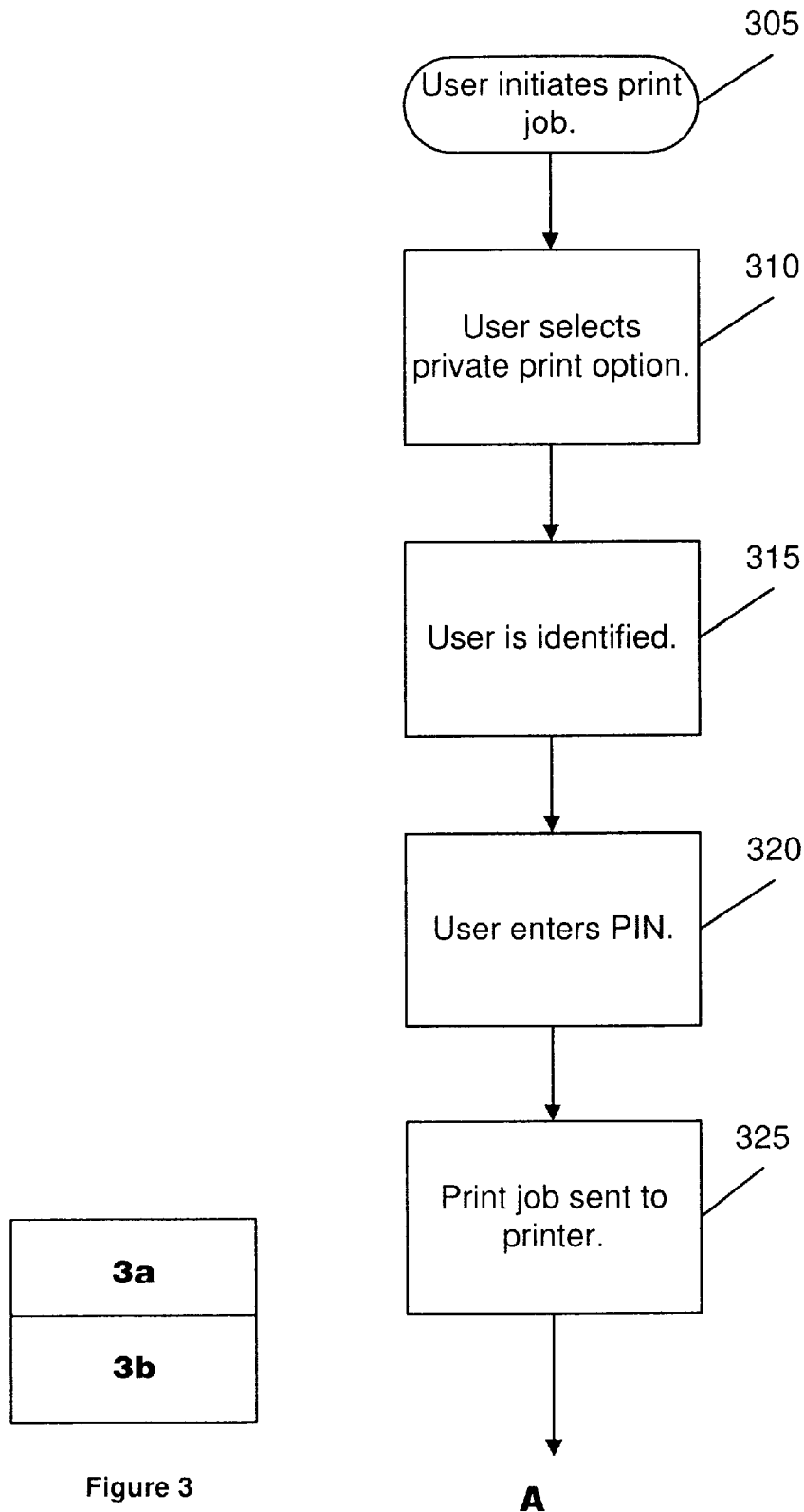
FIG. 3a-b is a flow chart showing the process of printing a private document in a accordance with the invention.
Figure 3B:
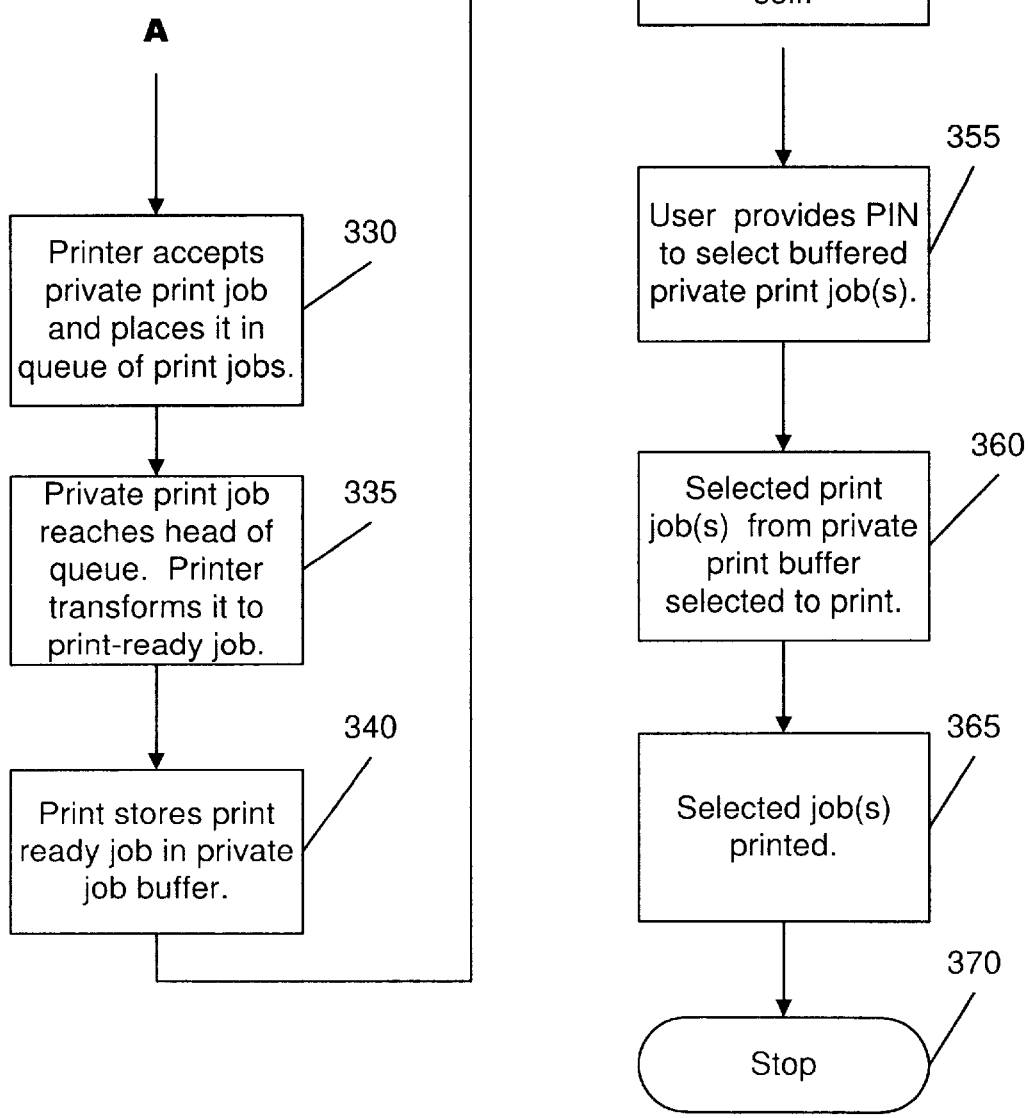

Referring now to FIG. 3a-b, there is shown a flow chart of the process of printing a print job in accordance with this invention. Private printing is set up at each workstation for all applications where printing is available. With the availability of private printing, as an option, whenever the user initiates a printjob from his or her workstation 150 at step 305, menu options are presented which include the choice of private printing. Thus, in accordance with menu options, the user, at step 310 may select a private print option. If such a selection has been made, the user is identified at step 315.

The identification may be made by the user inputting his or her identity in the form of a name or pseudonym, or the identity may be read from the user's workstation 150, where the workstation 150 is presumed to be assigned to a single user. Alternatively, if the user must sign onto the workstation 150 when beginning a work session, the user's identity, as a name or pseudonym, may be taken from the workstation directly. The user then, in step 320, enters a personal identification number (PIN). The PIN is associated with the specific private print job to be sent to the printer. A user may assign the same PIN to a number of different jobs, by sending a number of jobs and selecting the same PIN for each. This will enable the user to collect all the private print jobs at the same time with a single manual input of identifying information into the printer. Once all this information has been provided, the private print job is then sent to the printer in step 325, together with the information as to user identity, the PIN associated with the job, and a flag to indicate that a private print job is being transmitted.

The printer accepts the private print job in step 330, and identifies this it is a private print job. The printer places the private print job in its queue of print jobs. When the private print job reaches the head of the queue of print jobs, the printer changes it from its coded format to a graphical format (a print-ready job) in step 335. The printer then, in step 340 stores the print-ready job in a private job buffer. The private job buffer may be in the form of a private job queue within which jobs have a higher priority for printing than do jobs in the print queue. With the print-ready job ready to go, the printer sends a message to the user's workstation, informing the user, in step 345, that the print job is in the private print buffer and ready for printing. The printer continues to process other jobs until such time as the user walks up to the printer and uses the panel display and buttons to identify him or herself via manual input (step 350). The manually input identification may be effected by inputting the same information that the user input at workstation 150, e.g., inputting his or her name or pseudonym via an alphanumeric keyboard or touch screen with keyboard emulator. Alternatively, the printer may present the user with a selection of user identifications to choose from. This may be a long list of all users who are on the network or a short list of those users whose jobs are in the private print buffer.

The printer compares the identification obtained from the workstation 150 with that manually input by the user and if the two match (or if the user has selected an appropriate identification from the menu), then in step 355, the user inputs the PIN associated with one or more buffered private jobs. The printer looks for a match between the PIN(s) obtained from the workstation and associated with the job(s), and the PIN manually input by the user, and if a match is found, the selected job(s) is (are) from the private print buffer are chosen for printing rather than any jobs from the queue of ordinary jobs awaiting printing (step 360). In the alternative, the private print job(s) may be removed from the private print buffer and placed at the head of the queue of printjobs. Once the current job completes printing (not shown), the selected private print jobs job(s) is (are) printed at step 365, and the process is completed (step 370).

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A networked system comprising a plurality of workstations and a peripheral device, the peripheral device having a printing function, memory for storing a plurality of private print-readyjobs and input means for manually inputting information into the peripheral device, the peripheral device also being capable of:

accepting a private print job together with a PIN from a given workstation, placing the private print job into a queue of print jobs which have not yet been converted into print-ready print jobs, converting the private print job into a print-ready job, storing the print-ready job in a private print buffer, notifying the given workstation when the private print job is print-ready, accepting a manually input PIN from a user physically present at the peripheral device, comparing the PIN accepted from the given workstation with the PIN accepted from the physically present user and, if the PIN accepted from the given workstation corresponds to the PIN accepted from the physically present user, selecting the private print-ready job as the next job for printing, and printing the private print-ready job after prior print-ready print jobs have been printed;

wherein, after the peripheral device notifies the given workstation, the peripheral device is capable of continuing to process other print jobs irrespective of the private print job being print-ready.

2. The system as set forth in claim I wherein the peripheral device is also capable of identifying a workstation user who transmits a private print job from the given workstation and accepting user identification information from the user physically present at the peripheral device, comparing the user identification obtained from the given workstation with the user identification information accepted from the physically present user and, only if the user identification obtained from the given workstation also matches the user identification information accepted from the physically present user, then selecting the private print-ready job as the next job to be printed, and printing the print-ready job.

3. The system as set forth in claim 2 wherein the user identification obtained from the given workstation is an identification of the workstation.

4. The system as set forth in claim 2 wherein the user identification obtained from the given workstation is a name of the workstation user.

5. The system as set forth in claim 1 wherein the workstation user may assign an identical PIN to a number of different jobs and all the different jobs will be printed when the PIN accepted from the given workstation corresponds to the PIN accepted from the physically present user.

6. The system as set forth in claim 1 wherein the private print buffer is a private print queue whose jobs have a higher priority for printing than dojobs in the queue of print jobs.

7. The system as set forth in claim 1 wherein the peripheral device is a printer.

8. The system as set forth in claim 1 wherein the peripheral device is a multi-functional peripheral.

9. A process for providing private print jobs comprising the steps of:

(a) accepting a private print job together with a PIN from a given workstation;

(b) placing the private print job into a queue of print jobs;

(c) converting the private print job into a private print-ready job when the print-ready job reaches a head of the queue of print jobs;

(d) storing the private print-ready job in memory;

(e) notifying the given workstation when the private job is print-ready;

(f) continuing to process other print jobs irrespective of the private print job being print-ready;

(g) accepting a PIN from a user physically present at a peripheral device;

(h) comparing the PIN accepted from the given workstation with the PIN accepted from the physically present user; and (i) if the PIN accepted from the given workstation corresponds to the PIN accepted from the physically present user,
   (1) selecting the private print-ready job as the next job for printing, and
   (2) printing the print-ready job after priorprint-ready print jobs have been printed.

10. The process for providing private print jobs according to claim 9 comprising the additional steps of:

(a) identifying a workstation user who transmits a private print job from a given workstation;

(b) accepting user identification information from a user physically present at the peripheral device;

(c) comparing the user identification obtained from the given workstation with the user identification information accepted from the physically present user; and (d) only if the user identification obtained from the given workstation also matches the user identification information accepted from the physically present user,
   (i) selecting the private print-ready job as the next job for printing, and
   (ii) printing the print-ready job.

11. The process for providing private print jobs according to claim 9 comprising the additional steps of:

(a) the workstation user assigning an identical PIN to a number of different jobs; and (b) printing all the different jobs having identical PINs when the PINs accepted from the given workstation corresponds to the PIN accepted from the physically present user.

12. The process for providing private print jobs according to claim 10 wherein the workstation user is identified by selection of a user identification from a menu presented at the peripheral device.

13. A peripheral device, capable of being networked, and having a printing function, memory for storing a plurality of print-ready jobs and input means for manually inputting information into the peripheral device, the peripheral device being capable of:

accepting a private print job together with a PIN from a given workstation, placing the private print job into a queue of print jobs, converting the private print job into a print-ready job, storing the print-ready job in memory, notifying the given workstation when the private job is print-ready, and at any time thereafter,
   accepting a PIN from a user physically present at the peripheral device,
   comparing the PIN accepted from the given workstation with the PIN accepted from the physically present user and,
   if the PIN accepted from the given workstation corresponds to the PIN accepted from the physically present user, selecting the private print-readyjob as the nextjob for printing, and printing the print-ready job after prior print-ready print jobs have been printed;

wherein, after the peripheral device notifies the given workstation, the peripheral device is capable of continuing to process other print jobs irrespective of the private print job being print-ready.

14. The peripheral device as set forth in claim 13 wherein the peripheral device is also capable of identifying a workstation user who transmits a private printjob from a given workstation and accepting user identification information from a user physically present at the peripheral device, comparing the user identification obtained from the given workstation with the user identification information accepted from the physically present user and, only if the user identification obtained from the given workstation also matches the user identification information accepted from the physically present user, then placing the print-ready job at the head of the print queue and printing the print-ready job.

15. The peripheral device as set forth in claim 14 wherein the user identification obtained from the given workstation is an identification of the workstation.

16. The peripheral device as set forth in claim 14 wherein the user identification obtained from the given workstation is a name of the workstation user.

17. The peripheral device as set forth in claim 13 wherein the user may assign an identical PIN to a number of different jobs and all the different jobs will be printed when the PIN accepted from the given workstation corresponds to the PIN accepted from the physically present user.

18. A storage medium having a program stored thereon, the program having instructions for:

(a) accepting a private print job together with a PIN from a given workstation;

(b) placing the private print job into a queue of print jobs;

(c) converting the private print job into a print-ready job when the print-ready job reaches a head of the queue of print jobs;

(d) storing the print-ready job in memory;

(e) notifying the given workstation when the private job is print-ready;

(f) continuing to process other print jobs irrespective of the private print job being print-ready;

(g) accepting a PIN from a user physically present at a peripheral device;

(h) comparing the PIN accepted from the given workstation with the PIN accepted from the physically present user; and (i) if the PIN accepted from the given workstation corresponds to the PIN accepted from the physically present user,
   (1) selecting the private print-ready job as the next job for printing, and
   (2) printing the print-ready job after other prior print-ready print jobs have been printed.

19. The storage medium according to claim 18, the program stored thereon having additional instructions for:

(a) identifying a workstation user who transmits a private print job from a given workstation;

(b) accepting user identification information from a user physically present at the peripheral device;
(c) comparing the user identification obtained from the given workstation with the user identification information accepted from the physically present user; and
(d) only if the user identification obtained from the given workstation also matches the user identification information accepted from the physically present user,
  (i) selecting the private print-ready job as the next job for printing, and
  (ii) printing the print-ready job.

20. The storage medium according to claim 18, the program stored thereon having additional instructions for:
  (a) the workstation user assigning an identical PIN to a number of different jobs; and
  (b) printing all the different jobs having identical PINs when the PINs accepted from the given workstation corresponds to the PIN accepted from the physically present user.

* * * * *